United States Patent

[11] 3,607,868

| [72] | Inventors | Georg Anner<br>Basel;<br>Peter Wieland, Oberwil, Basel-Land, both of Switzerland |
|------|-----------|---|
| [21] | Appl. No. | 746,278 |
| [22] | Filed | July 22, 1968 |
| [45] | Patented | Sept. 21, 1971 |
| [73] | Assignee | CIBA Corporation<br>Summit, N.J. |
| [32] | Priority | Dec. 4, 1964 |
| [33] | | Switzerland |
| [31] | | 15741/64 |

[54] Δ⁴-3-OXO ANDROSTENES AND PROCESS FOR THEIR MANUFACTURE
16 Claims, No Drawings

[52] U.S. Cl. .................................................. 260/239.55,
260/397.3, 260/397.5
[51] Int. Cl. .................................................. C07c173/00
[50] Field of Search .......................................... 260/397.3,
239.55 C

[56] References Cited
UNITED STATES PATENTS

| 2,311,102 | 2/1943 | Wettstein | 260/397.4 |
| 2,332,815 | 10/1943 | Ruzicka | 260/397.3 |
| 3,083,199 | 3/1963 | Caglioti et al. | 260/239.55 |
| 3,102,127 | 8/1963 | Bowers | 260/397.4 |
| 3,262,949 | 7/1966 | Ringold et al. | 260/397.3 |

OTHER REFERENCES

Campbell et al., J. Amer. Chem. Soc., 81, pp. 4069-4074 pages 4069 and 4071 relied on

*Primary Examiner*—Lewis Goth
*Assistant Examiner*—Ethel G. Love
*Attorneys*—Harry Goldsmith, Joseph G. Kolodny and Bryant W. Brennan ABSTRACT: The invention involves converting a Δ⁵-3-hydroxy-17-androstene, in known manner, into the ethyleneketal, brominating, then oxidizing the brominated steroid in a neutral or preferably basic medium and finally eliminating hydrogen bromide from the resulting product. This Δ⁴,⁶-3,17-dioxoandrostadiene-17-ethyleneketal may be treated with dilute acid to form the free dioxo compound or treated with methyl magnesium halide in the presence of copper salt to form a Δ⁴-3,17-dioxo-17α- and 17β-methyl androstene-17-ethyleneketal. The ketals may be converted into the free dioxo compounds.

3,607,868

Δ⁴-3-OXO ANDROSTENES AND PROCESS FOR THEIR MANUFACTURE

CROSS-REFERENCE TO RELATED APPLICATIONS

This is a continuation-in-part application of application Ser. No. 510,694, filed Nov. 30, 1965 (now abandoned). It is known that $\Delta^4$-3-oxoandrostenes that contain in 17-position a further oxo group and in 6,7-position a further double bond or in 7-position a methyl group, especially an $\alpha$-methyl group can be manufactured from $\Delta^5$-3-hydroxy-17-oxoandrostene. However, in this reaction numerous difficulties had to be overcome and the total yield remained within very moderate limits.

The present invention is based on the unexpected observation that these substances can be obtained in a simple manner and in high yield by converting $\Delta^5$-3-hydroxy-17-oxoandrostene in the known manner into the ethyleneketal, brominating and oxidizing the latter in a neutral or preferably basic medium and eliminating hydrogen bromide from the resulting intermediate. If desired, the resulting $\Delta^{4,6}$-3,17-dioxoandrostadiene-17-ethyleneketal may be converted with dilute acid into the corresponding free dioxo compound or converted with a methyl magnesium halide in the presence of a copper salt into the $\Delta^4$-3,17-dioxo-7$\alpha$- and -7$\beta$-methylandrostene-17-ethyleneketals. The latter can then themselves be converted into the free diketo compounds.

As mentioned above the individual process steps are performed in the known manner. Thus, $\Delta^5$-3-hydroxy-17-oxoandrostene is ketalized by reacting it with ethyleneglycol in the presence of a catalytic amount of a strong organic or inorganic acid, such as paratoluenesulfonic acid or concentrated sulfuric acid. Preferred diluents are aromatic hydrocarbons, such as benzene and toluene.

The bromination can be achieved with a solution of bromine in a halogenated hydrocarbon, such as chloroform, carbon tetrachloride, tetrachloroethylene, or an organic aromatic base that contains nitrogen, such as collidine, quinoline or, above all, pyridine, if desired or required in the presence of a buffer such as an organic base or potassium carbonate. The best yield is obtained, however, by performing the bromination with an adduct of bromine with pyridine hydrobromide in pyridine. The oxidation is likewise advantageously performed in a neutral or preferably in a basic medium. If desired the brominated intermediate product can be isolated or, if the reaction was performed in an organic base, it may be further processed as it is. A preferred oxidant is chromic acid or catalytically activated oxygen, for example oxygen in the presence of platinum oxide.

The elimination of hydrogen bromide in the resulting bromide is preferably carried out in dimethylformamide at a temperature from about 80° to about 150° C. with a lithium salt, such as lithium chloride, lithium carbonate and/or in the first place lithium bromide. Alternatively, dehydrobromination may be achieved by heating in a nitrogen-containing aromatic base, such as collidine or picoline.

If desired, the resulting $\Delta^{4,6}$-3,17-dioxoandrostadiene-17-ethyleneketal can be converted into $\Delta^4$-3,17-dioxo-7$\alpha$-methylandrostadiene-17-ethyleneketal under the conditions of the Karash-Gringnard reaction; for this purpose there are added to the diene compound a methyl magnesium halide, especially the bromide, in an ether such as diethyl ether, tetrahydrofuran or dioxane or in an aromatic hydrocarbon such as benzene or toluene or in a mixture thereof, as well as a cuprous or cupric salt, especially cuprous chloride.

The 17-ketal group in the resulting $\Delta^{4,6}$- or $\Delta^4$-7-methyl compounds can be hydrolyzed, for example by treatment with an acid, the yield being substantially quantitative.

The 17-ethyleneketal of $\Delta^{4,6}$-3,17-dioxoandrostadiene and of $\Delta^4$-3,17-dioxo-7$\alpha$-methylandrostene are new. They are important intermediates for the manufacture of, for example, the highly active 7$\alpha$-methyloestradiol described in Pat. application No. 420,147, filed Dec. 21, 1964 by Georg Anner et al., now U.S. Pat. No. 3,318,927.

The following Example illustrates the invention.

EXAMPLE

A solution of 20 g. of $\Delta^5$-3$\beta$-hydroxy-17-oxoandrostene and 400 mg. of paratoluenesulfonic acid in 1 liter of benzene and 10 ml. of ethyleneglycol is vigorously stirred and boiled for 3¾ hours on a water separator, whereupon the batch is allowed to cool. 100 ml. of a saturated sodium bicarbonate solution are added, the aqueous solution is extracted with benzene, and the extract is washed with water, dried over sodium sulfate and evaporated under vacuum. Crystallization of the residue from methanol and drying at 60° C. in a high vacuum yields 21 g. of $\Delta^5$-3$\beta$-hydroxy-17-oxoandrostene-17-ethyleneketal melting at 165° to 166° C.

20 g. of the resulting ketal are stirred into an ice-cooled solution of 20.2 g. of an adduct of bromine with pyridine hydrobromide in 200 ml. of pyridine. The whole is stirred for 3 hours at 0° C. and then poured into an ice-cold, stirred mixture of 15 g. of chromium trioxide and 150 ml. of pyridine, followed by flushing with 50 ml. of pyridine. The batch is stirred for 3 hours while being cooled with ice and then for 17 hours at room temperature, then diluted with water and extracted three times with benzene. The combined solutions are washed three times with water, dried and evaporated at a bath temperature of 35° C. under vacuum. The residue, which still contains some residual pyridine, is mixed with 36 g. of lithium carbonate, 36 g. of lithium bromide and 360 ml. of dimethylformamide and the batch is stirred for 1¾ hours under nitrogen at a bath temperature of 100° C., then allowed to cool, and the lithium carbonate is suctioned off and rinsed with methylenechloride. The filtrate is washed with water, whereupon the aqueous solutions are once more extracted with methylenechloride, and the organic extracts are dried and evaporated under vacuum. To remove any residual dimethylformamide the residue is dissolved in xylene, evaporated under vacuum and this operation is repeated once with toluene. The product is then taken up in benzene, and the benzene solution is filtered through 100 g. of alumina (activity II) and the alumina is rinsed with 2 liters of benzene. The filtrate is evaporated under vacuum and the residue recrystallized from a mixture of methylenechloride+ether+pentane, to yield 13.51 g. of $\Delta^{4,6}$-3,17-dioxoandrostadiene-17-ethyleneketal melting at 157° to 158° C. On crystallization of the mother liquor from ether another 1.62 g. of the identical compound are obtained. Optical rotation $[\alpha]_D^{20}=+5°$ ($c=0.603$ in chloroform). 285 m$\mu$($\epsilon=26200$). Infrared spectrum in methylenechloride: 6.01$\mu$(3-ketone), 6.16+6.25m$\mu$($\Delta^{4,6}$ double bonds).

300 ml. of tetrahydrofuran and then gradually 2.4 g. of cuprous chloride are stirred under nitrogen into a methyl magnesium bromide solution prepared from 12 g. of magnesium, methylbromide and 150 ml. of ether, whereupon at a temperature from $-10$ to $-6°$ C. a solution of 16 g. of the resulting dienone in 240 ml. of tetrahydrofuran is slowly and vigorously stirred in dropwise, followed by rinsing with 60 ml. of tetrahydrofuran. On completion of the dropwise addition the batch is stirred for another 1½ hours at the same temperature and then decomposed with dilute ammoniumchloride solution. The aqueous phase is extracted with benzene, and the organic extracts are washed with saturated ammoniumchloride solution, dried and evaporated under vacuum. Chromatography on alumina (activity II) furnishes at first $\Delta^4$-3,17-dioxo-7$\alpha$-methylandrostene-17-ethyleneketal. This elvate is followed by mixed fractions and then by pure $\Delta^4$-3,17-dioxo-7$\beta$-methylandrostene-17-ethyleneketal. After repeated chromatography there are obtained 7.72 g. of the 7$\alpha$-methyl compound which, after recrystallization from methanol, melts at 112° to 112.5° C. Optical rotation $[\alpha]_D^{20}=+81$($c=0.581$ in chloroform) and 1.8 g. of the 7$\beta$-isomers melting at 140° to 141.5° C. Optical rotation $[\alpha]_D^{20}=+52°$ ($c=0.664$ in chloroform).

When 4 g. of $\Delta^4$-3,17-dioxo-7$\alpha$-methylandrostene-17-ethyleneketal are boiled for 16 hours with 8 g. of 2,3-dichloro- 5,6-dicyano-1,4-benzoquinone in 400 ml. of dioxane, the 3-oxo-7α-methyl-17-ethylenedioxy-Δ$^{1,4}$-androstadiene described in the aforementioned Patent application is obtained.

What is claimed is:

1. Process for the preparation of Δ$^{4,6}$-3-oxoandrostadienes that contain in 17-position a 17-ethyleneketal group, which comprises converting Δ$^5$-3-hydroxy-17-oxoandrostene into the ethyleneketal, brominating and oxidizing the latter in a neutral to basic medium and eliminating hydrogen bromide from the resulting intermediate.

2. Process as claimed in claim 1, wherein the bromination is carried out with a solution of bromine in a halogenated hydrocarbon or in an organic aromatic base that contains nitrogen.

3. Process as claimed in claim 2, wherein the bromination is carried out with an adduct of bromine with pyridine hydrobromide in pyridine.

4. Process as claimed in claim 1, wherein oxidation is performed in a basic medium.

5. Process as claimed in claim 4, wherein oxidation is performed with chromic acid in pyridine.

6. Process as claimed in claim 5 wherein the elimination of hydrogen bromide is carried out in dimethylformamide with a lithium salt.

7. Process as claimed in claim 6, wherein there are used lithium carbonate and lithiumbromide at a temperature from about 80° to about 150° C.

8. Process for the preparation of Δ$^{4,6}$-3-oxoandrostadienes that contain in 17-position a 17-ethyleneketal group and in 7-position a methyl group, which comprises converting Δ$^5$-3-hydroxy-17-oxoandrostene into the ethyleneketal, brominating and oxidizing the latter in a neutral to basic medium and eliminating hydrogen bromide from the resulting intermediate, and converting the resulting Δ$^{4,6}$-3,17-dioxoandrostadiene-17-ethyleneketal with a magnesium halide in the presence of a copper salt into the Δ$^4$-3,17-dioxo-7-methyl-androstene-17-ethyleneketal.

9. Process as claimed in claim 8, wherein the bromination is carried out with a solution of bromine in a halogenated hydrocarbon or in an organic aromatic base that contains nitrogen.

10. Process as claimed in claim 9, wherein the bromination is carried out with an adduct of bromine with pyridine hydrobromide in pyridine.

11. Process as claimed in claim 8, wherein oxidation is performed in a basic medium.

12. Process as claimed in claim 11, wherein oxidation is performed with chromic acid in pyridine.

13. Process as claimed in claim 12, wherein the elimination of hydrogen bromide is carried out in dimethyl-formamide with a lithium salt.

14. Process as claimed in claim 13, wherein there are used lithium carbonate and lithiumbromide at a temperature from about 80° to about 150° C.

15. Process as claimed in claim 1, wherein the 17-ketal obtained is converted into the free 17-oxo-compound.

16. Process as claimed in claim 8, wherein the 17-ketal obtained is converted into the free 17-oxo-compound.